United States Patent
Zribi

(10) Patent No.: US 10,140,831 B2
(45) Date of Patent: Nov. 27, 2018

(54) IONIZATION AIR FILTERS FOR HAZARDOUS PARTICLE DETECTION

(71) Applicant: Carrier Corporation, Farmington, CT (US)

(72) Inventor: Anis Zribi, Colorado Springs, CO (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 15/307,494

(22) PCT Filed: Apr. 17, 2015

(86) PCT No.: PCT/US2015/026375
§ 371 (c)(1),
(2) Date: Oct. 28, 2016

(87) PCT Pub. No.: WO2015/187249
PCT Pub. Date: Dec. 10, 2015

(65) Prior Publication Data
US 2017/0061757 A1   Mar. 2, 2017

Related U.S. Application Data

(60) Provisional application No. 62/007,182, filed on Jun. 3, 2014.

(51) Int. Cl.
*G08B 17/11* (2006.01)
*G08B 17/10* (2006.01)
(Continued)

(52) U.S. Cl.
CPC .............. *G08B 17/11* (2013.01); *G08B 7/066* (2013.01); *G08B 17/10* (2013.01); *B01D 46/0086* (2013.01)

(58) Field of Classification Search
CPC ........ G08B 17/11; G08B 7/066; G08B 17/10; B01D 46/0086
See application file for complete search history.

(56) References Cited

U.S. PATENT DOCUMENTS 3,763,633 A * 10/1973 Soltis ................... B03C 3/155
  55/485
4,118,689 A * 10/1978 Peil ......................... G08B 17/11
  250/381
(Continued)

FOREIGN PATENT DOCUMENTS

CN    101549168    9/2012
DE    10357371 A1  7/2005
(Continued)

OTHER PUBLICATIONS

PCT International Search Report and Written Opinion dated Sep. 21, 2015, issued on corresponding PCT International Application No. PCT/US2015/026375 (16 pages).

*Primary Examiner* — Mohamed Barakat
(74) *Attorney, Agent, or Firm* — Locke Lord LLP; Scott D. Wofsy

(57) ABSTRACT

An air filtration for detecting hazardous particles includes a housing having an air flow pathway extending therethrough. The housing is configured to receive air flow from an inlet of the housing and to expel air flow from an outlet of the housing. A pair of electrodes are positioned within the air flow pathway. A sensor system is operatively connected to the pair of electrodes to measure electrical current flowing therebetween. A processor is operatively connected to the sensor system to compare the measured electrical current with a stored baseline current. An alarm is operatively connected to the processor. The processor activates the alarm when the measured electrical current is different than the stored baseline current.

17 Claims, 3 Drawing Sheets

(51) Int. Cl.
*G08B 7/06* (2006.01)
*B01D 46/00* (2006.01)

(56) References Cited

U.S. PATENT DOCUMENTS

| | | | |
|---|---|---|---|
| 5,182,542 A | | 1/1993 | Adelman et al. |
| 5,243,330 A | * | 9/1993 | Thuillard ............... G08B 17/11 |
| | | | 250/381 |
| 5,945,924 A | | 8/1999 | Marman et al. |
| 6,362,743 B1 | * | 3/2002 | Tanguay ............... G08B 17/107 |
| | | | 250/384 |
| 6,613,130 B2 | * | 9/2003 | Givargis ............. B01D 50/006 |
| | | | 55/315.2 |
| 6,897,774 B2 | | 5/2005 | Costa et al. |
| 7,579,589 B2 | | 8/2009 | Miller et al. |
| 7,777,633 B2 | | 8/2010 | Knox et al. |
| 8,080,094 B2 | | 12/2011 | Vanderginst |
| 8,508,376 B2 | | 8/2013 | Knox et al. |
| 2003/0145568 A1 | | 8/2003 | Hodge |
| 2005/0030172 A1 | * | 2/2005 | Right ..................... G08B 17/10 |
| | | | 340/521 |
| 2007/0176783 A1 | | 8/2007 | Knox et al. |
| 2009/0002182 A1 | | 1/2009 | Knox et al. |
| 2009/0038480 A1 | | 2/2009 | Garman et al. |
| 2010/0194574 A1 | | 8/2010 | Monk et al. |
| 2011/0058167 A1 | | 3/2011 | Knox et al. |
| 2011/0185895 A1 | * | 8/2011 | Freen ..................... G01N 15/08 |
| | | | 95/25 |
| 2012/0235822 A1 | | 9/2012 | Barson |

FOREIGN PATENT DOCUMENTS

| | | | |
|---|---|---|---|
| DE | 102011053768 | | 2/2013 |
| GB | 2487212 A | * | 7/2012 ............. F24F 7/007 |
| GB | 2487212 A | | 7/2012 |

* cited by examiner

IONIZATION AIR FILTERS FOR HAZARDOUS PARTICLE DETECTION

CROSS-REFERENCE TO RELATED APPLICATIONS

This application is the national phase under 35 U.S.C. § 371 of PCT International Application No. PCT/US2015/026375, filed Apr. 17, 2015, which claims the benefit of and priority to U.S. Provisional Patent Application No. 62/007,182 filed Jun. 3, 2014, the contents of which are incorporated by reference herein in their entirety.

BACKGROUND OF THE INVENTION

1. Field of the Invention

The present disclosure relates to ionization air filters, and more particularly to enhancing ionization air filters for the purpose of detecting hazardous particles and actively defining a fire egress path.

2. Description of Related Art

In air filtration systems, for example, electrically enhanced air filtration systems, electrostatic filters collect impurities in airflow through the system before the airflow is circulated through a space such as a home or other building. The air filtration systems utilize high voltage and ions to enhance the particle collection efficiency of the electrostatic filters. Such filters incorporate a conductive electrode at a downstream side of the filter. These filtration systems are efficient in removing unwanted particles in the airflow, particularly large particles such as dirt and smoke.

Ionization smoke detectors operate in a similar manner. These smoke detectors use ions to charge the smoke particles to detect the amount of smoke in the air. However, in typical commercial or residential buildings, the filtration system, smoke detectors and heating and ventilation (HVAC) systems are all separately operated components.

In order to prevent oxygen from flowing to and feeding a fire, the HVAC systems are completely shut down once smoke is detected and a smoke alarm is activated. This can potentially create difficulty breathing and seeing for occupants trying to exit the building. Currently only visual and audible cues provide assistance in learning of a fire or hazardous condition and finding a safe egress path.

Such conventional methods and systems have generally been considered satisfactory for their intended purpose. However, there is still a need in the art for improved systems that combine the air filtration and smoke detection functions in a heating and ventilation system within a building to provide increased smoke detection as well as filtered air through an egress path. The present disclosure provides a solution for this need.

SUMMARY OF THE INVENTION

An air filtration unit for detecting hazardous particles, for example, smoke particles, is disclosed. The air filtration unit can include a housing having an air flow pathway extending therethrough. The housing is configured to receive air flow from an inlet of the housing and to expel air flow from an outlet of the housing. A pair of electrodes is positioned within the air flow pathway. A sensor system is operatively connected to the pair of electrodes to measure electrical current flowing therebetween. A processor is operatively connected to the sensor system to compare the measured electrical current with a stored baseline current. An alarm is operatively connected to the processor. The processor activates the alarm when the measured electrical current is different than the stored baseline current.

The pair of electrodes can be operative to produce electrical fields for ion acceleration and electrical current generation.

The air filtration unit can also include a memory operatively connected to the processor for storing at least one electrical current measurement as the stored baseline current. The electrical current can be measured under conditions with no hazardous particles present to establish the stored baseline current.

The air filtration unit can also include a power source operatively connected to the sensor system to supply power to the pair of electrodes. For example, the power source can provide a tunable DC current.

In certain embodiments, a light source and an optical sensor are disposed within the housing. The optical sensor is operatively connected to the processor and disposed within the housing and spaced apart from the light source. A sensor system is operatively connected to the optical sensor to monitor the air flow exiting the housing.

The optical sensor can be operative to detect hazardous particles in the airflow pathway such that the processor activates the alarm when the hazardous particles are detected.

An air filtration and evacuation system includes at least one air filtration unit. Each unit has a housing having an air flow pathway extending therethrough. The housing is configured to receive air flow from an inlet of the housing and to expel air flow from an outlet of the housing. Each unit also has a pair of electrodes within the air flow pathway. A central sensor system is operatively connected to each pair of electrodes to sample an electrical measurement flowing therebetween. A processor is operatively connected to the central sensor system to compare the electrical measurement with a stored signature. An alarm is operatively connected to the processor. The processor activates the alarm when the electrical measurement is different from the stored signature. A ventilation system is operatively connected to the central sensor system. At least one vent of the air conditioning system can be closed when the electrical measurement is different from than the stored signature. An electrical measurement different from the stored signature can be indicative of a hazardous condition within a building.

In addition, the central sensor system can selectively open at least one vent of the air conditioning system to establish an egress path for building occupants. Further, the central sensor system can be operatively connected to a lighting system such that upon detecting hazardous particles the control panel illuminates an egress path for building occupants through the lighting system.

A method for creating an egress path in a building includes first detecting hazardous particles indicative of a hazardous condition. To prevent air flow to the hazardous condition, the method includes selectively closing at least one vent of a heating ventilation and air conditioning (HVAC) unit of a building. To create an egress path of circulated air, the method includes selectively activating at least one electrostatic filter to trap the hazardous particles from the air. The method also includes, selectively illuminating the egress path through the lighting system of the building to allow building occupants to visually determine the best way to safety.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
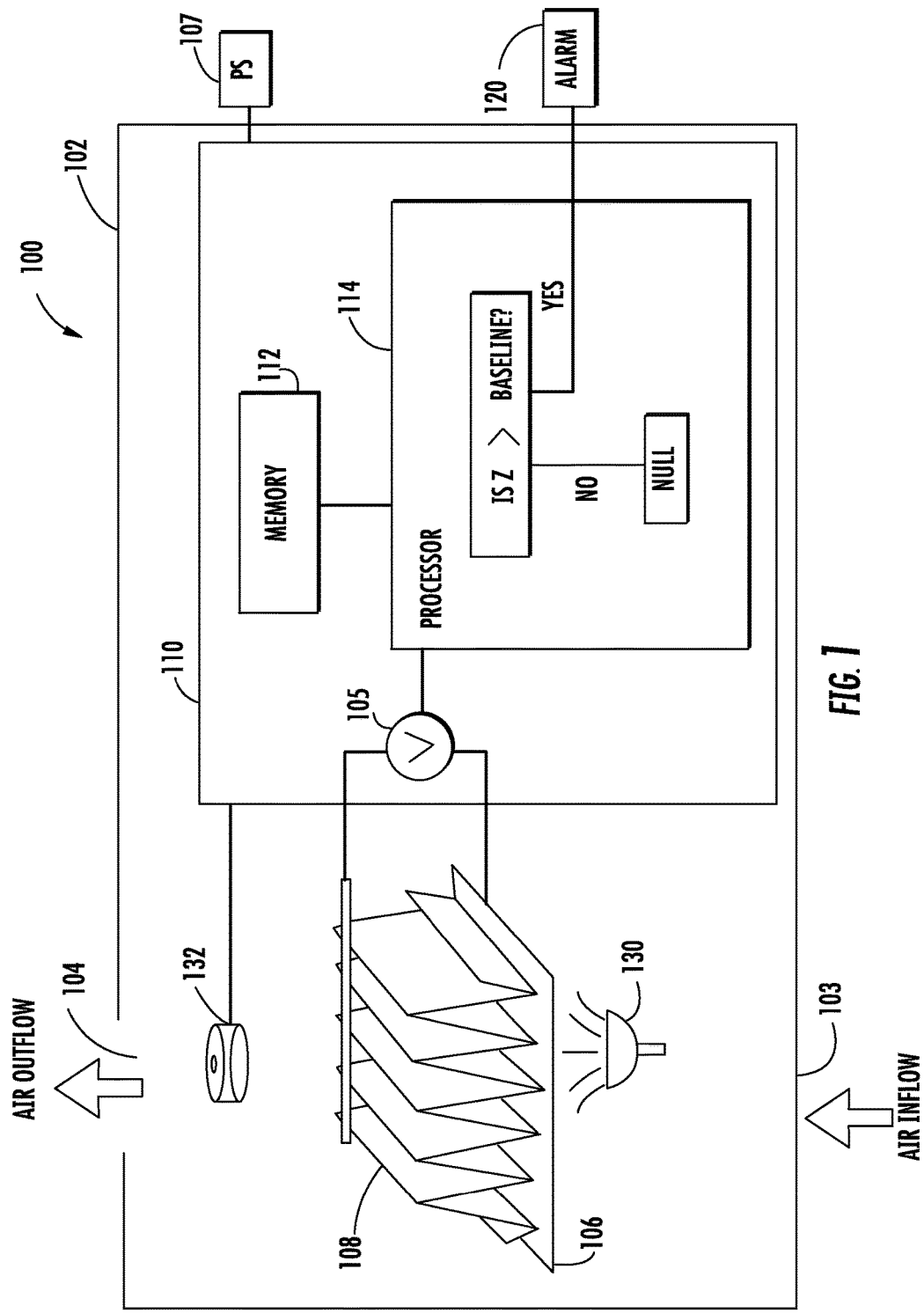
FIG. 1 is a schematic view of an exemplary embodiment of an ionization air filter constructed in accordance with the present disclosure.

Reference will now be made to the drawings wherein like reference numerals identify similar structural features or aspects of the subject disclosure. For purposes of explanation and illustration, and not limitation, a partial view of an exemplary embodiment of the ionization air filter in accordance with the disclosure is shown in FIG. 1 and is designated generally by reference character 100. Other embodiments of the air filter in accordance with the disclosure, or aspects thereof, are provided in FIGS. 2-3, as will be described. The systems and methods described herein can be used to provide increased hazardous particle detection and filtration of airflow while providing an egress path during hazardous conditions.

With reference to FIG. 1, an air filtration unit 100 for detecting hazardous particles is shown. The air filtration unit 100 includes a housing 102 having an air flow pathway therethrough. The housing is configured to receive air from an inlet 103 and expel air from an outlet 104. A pair of electrodes 106, 108 are positioned within the housing and operatively connected to a sensor system 110. The pair of electrodes 106, 108 includes an ionizer electrode 106 and a filter 108. The pair of electrodes 106, 108 is operative to produce electrical fields for ion acceleration and electrical current generation. As air particles flow through the housing, the particles are charged either with positive or negative ions through the ionizer electrode 106. The charged particles adhere to the filter 108. An electrical current, e.g., a DC current, is applied to the pair of electrodes 106, 108 through a power source 107 operatively connected to the sensor system 110. The sensor system 110 measures the electrical current flowing between the ionizer electrode 106 and the filter 108. As shown, the flow of electrical current is measured by a voltage tester 105, however, it is to be understood that any method to measure flow of current may be used. The electrical current measurement indicates the amount of hazardous particles present between the ionizer electrode 106 and the filter 108. More specifically, a change in electrical current measurement between the pair of electrodes 106, 108 from an established baseline indicates a change in the amount of particles, for example, smoke particles, within the air flowing through the housing. Smoke particles will deionize air molecules therefore a lower than baseline electrical measurement can indicate the presence of smoke particles in the air. The presence of smoke particle indicates a potential hazardous condition, such as a fire. The air filtration unit is shown and described for the detection of smoke particles and indication of a fire, however, it will be understood that the detection of any increase or decrease in particle concentration may be detected with the air filtration unit of the present invention.

The electrical current is measured under conditions with no hazardous particles present to establish the stored baseline current which is recorded through a memory 112 operatively connected to a processor 114. The processor 114 continually compares the measured electrical current with the stored baseline current. Once the measured electrical current is different from the stored baseline, an alarm 120 operatively connected to the processor is activated indicating a hazardous condition. The sensor system 110 is not limited to measuring only electrical current. The sensor system 110 may also measure voltage between the pair of electrodes or a similar electrical measurement to establish a baseline signature. As the sensor system 110 samples the electrical measurement, an electrical measurement different from the baseline signature activates the alarm 120.

In an additional embodiment, a light source 130 and an optical sensor 132 are optionally used to measure particles in the airflow through the housing. The pair of electrodes 106, 108 are disposed between the light source 130 and the optical sensor 132. The optical sensor 132 is operative to detect particle size and in particular, large particles, such as smoke. The optical sensor 132 is operatively connected to the processor 114 such that the processor 114 activates the alarm 120 when hazardous particles are detected.

Figure 2:
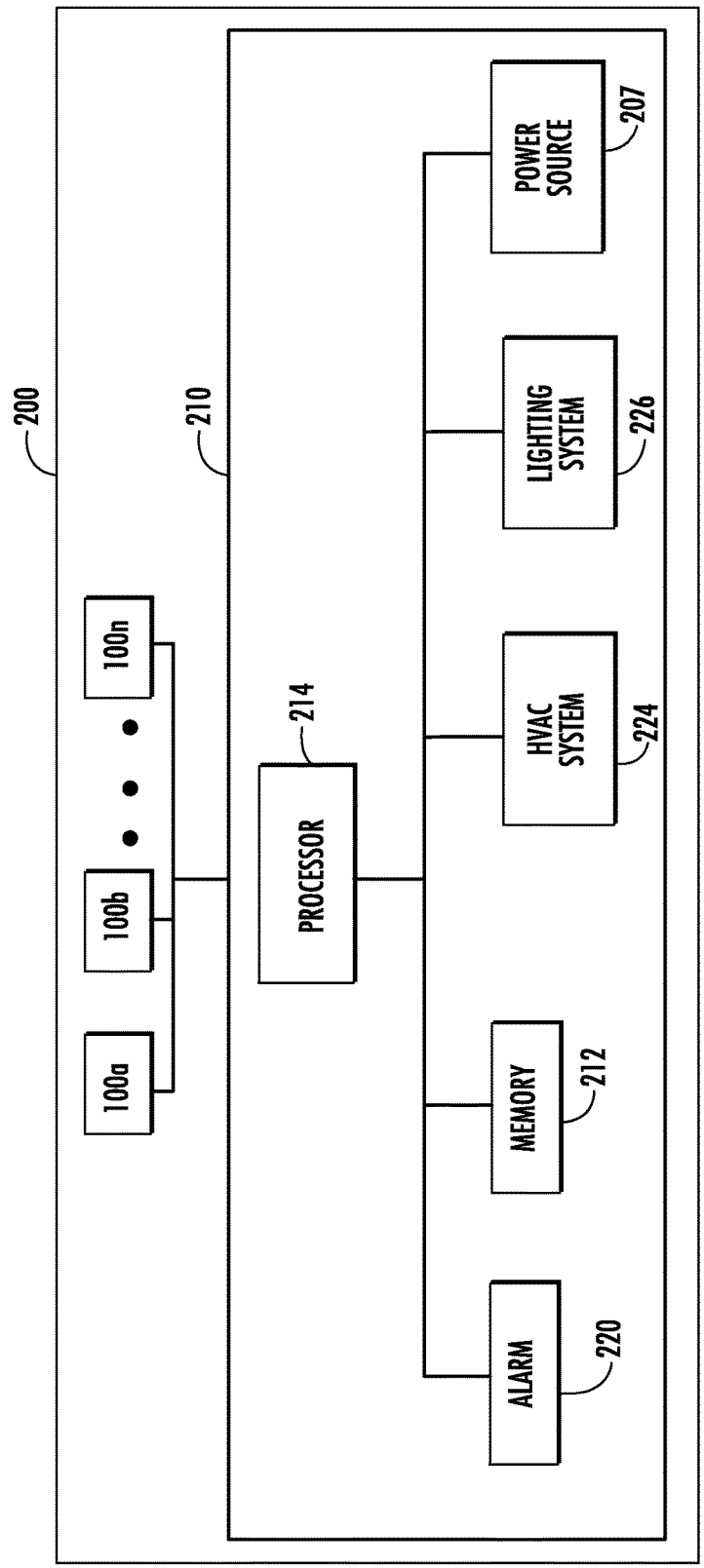
FIG. 2 is a schematic view of an air filtration system using the ionization air filter of FIG. 1.

With reference to FIG. 2, a schematic view of an air filtration and evacuation system 200 is shown. The system 200 utilizes at least one air filtration unit 100a, 100b similar to the air filtration unit 100 shown in FIG. 1. Each unit 100a, 100b includes a housing having an air flow pathway extending therethrough and a pair of electrodes 106,108 within the air flow pathway.

Each unit 100a, 100b is operatively connected to a central sensor system 210 to measure electrical current between the pair of electrodes 106,108. As described above, a current is supplied to the pair of electrodes 106,108 and the electrical current is measured to establish a stored baseline current in a memory 212. A processor 214 compares the measured electrical current to the stored baseline current to detect when an increase in current occurs, which would indicate an increased presence of hazardous particles. When an increase in current occurs, the processor 214 then activates an alarm 220 notifying building occupants of a hazardous condition.

The system 200 also includes a ventilation system 224. More specifically, the heating, ventilation and air conditioning (HVAC) system of the building is operatively connected to the central sensor system 210. Upon identification of a hazardous condition, i.e., when then measured electrical current is different than the stored baseline current, at least one vent of the HVAC system 224 is closed to prevent oxygen from feeding the hazardous condition. For example, when increased smoke particles are detected indicating the presence of a fire, at least one vent of the HVAC system 224 is closed to prevent oxygen from feeding the fire. The at least one vent closed is closest in proximity to the unit 100n which indicates the presence of increased particles, in this example, smoke particles. The remaining vents of the HVAC system 224 are left open to allow air circulation in the remaining parts of the building. This allows for constant air circulation through units 100n where no hazardous condition is present. In other words, air continues to be filtered in parts of the building where no fire is believed present while air circulation is ceased in parts of the building where a fire is detected. In this manner, a filtered air pathway is created to establish an egress path for building occupants. In addition, continuous filtered air circulates through the building allowing for occupants in the building to breathe easier.

Figure 3:
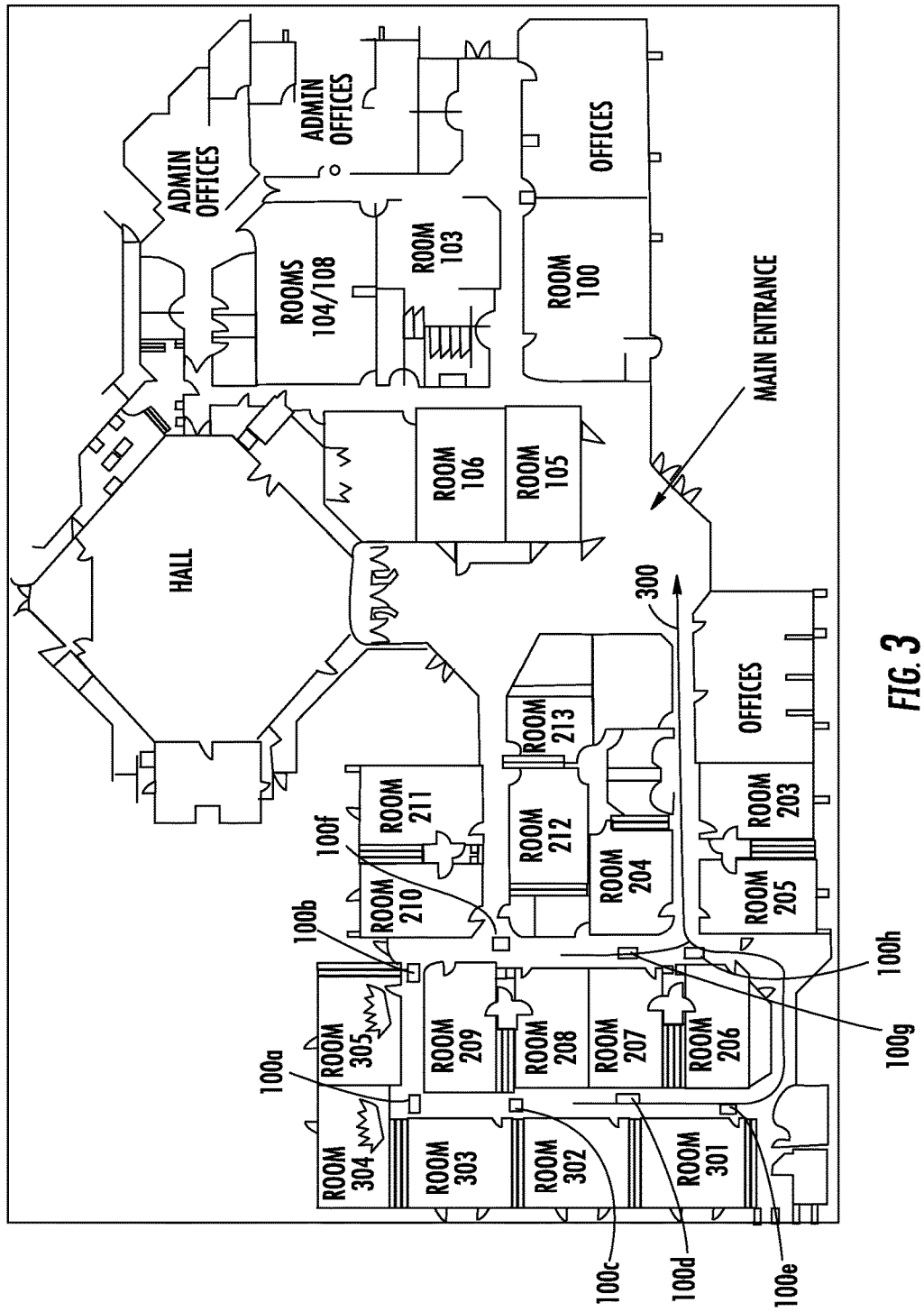
FIG. 3 is a schematic view of an egress path created using the ionization air filtration system of FIG. 2.

With reference to FIG. 3, a sample building layout is shown illustrating an egress path 300. In this example, a fire is detected in rooms 304 and 305 using filtration units 100a, 100b. Vents of the HVAC system closest to units 100a, 100b, 100c and 100f are closed to prevent additional airflow to the area where the fire is detected. Vents of the HVAC system near the remaining units 100d, 100e, 100g, 100h remain open therefore continuing to circulate filtered air and create an egress path 300 of filtered air for building occupants.

Turning back to FIG. 2, the system 200 is operatively connected to the lighting system 226 in the building. More specifically, the central sensor system 210 is operatively connected to the building lighting system 226 such that upon detecting hazardous particles the control panel illuminates an egress path for building occupants. Continuing with the example shown in FIG. 3, once the fire is detected in rooms 304 and 305, the lighting in the surrounding rooms, for example, rooms 303, 209, 210, can be turned off or diminished to indicate to building occupants to steer away from those rooms. To create an egress, the lighting in and around rooms 301, 302, 208, 207, 206, 205, 204, 203 can be left on or begin flashing to indicate a safe exit towards the main entrance for occupants.

A method for creating an egress path in a building is also disclosed. The method includes first detecting hazardous particles indicative of a hazardous condition. Next, to prevent air flow to the hazardous condition, selectively closing at least one vent of a heating ventilation and air conditioning (HVAC) unit of a building. To create an egress path of circulated air, selectively activating at least one electrostatic filter to trap the hazardous particles from the air. In addition, selectively illuminating the egress path through the lighting system of the building allows building occupants to visually determine the best way to safety. Further, the step of detecting hazardous particles includes utilizing the air filtration unit as shown and described in FIG. 1.

The methods and systems of the present disclosure, as described above and shown in the drawings, provide for an air filtration unit with superior properties including detecting hazardous particles, e.g., smoke particles, through current measurement between a pair of electrodes. In addition, the air filtration unit can be used to create an egress path during a building fire. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An air filtration unit for detecting hazardous particles comprising:
    a housing having an air flow pathway extending therethrough, the housing configured to receive air flow from an inlet of the housing and to expel air flow from an outlet of the housing;
    a pair of electrodes within the air flow pathway, wherein the pair of electrodes includes an ionizer electrode and a filter, the ionizer electrode being configured to charge particles comprised in the air flow so that the particles adhere to the filter;
    a sensor system operatively connected to the pair of electrodes to measure electrical current flowing therebetween;
    a processor operatively connected to the sensor system to compare the measured electrical current with a stored baseline current, wherein the processor selectively activates at least one electrostatic filter to trap the hazardous particles from the air and create an egress path; and
    an alarm operatively connected to the processor, wherein the processor activates the alarm when the measured electrical current is different from the stored baseline current.

2. The air filtration unit as in claim 1, wherein the pair of electrodes are operative to produce electrical fields for ion acceleration and electrical current generation.

3. The air filtration unit as in claim 1, further comprising:
    a memory operatively connected to processor for storing at least one electrical current measurement as the stored baseline current.

4. The air filtration unit as in claim 1, wherein the current is measured under conditions with no hazardous particles present to establish the stored baseline current.

5. The air filtration unit as in claim 1, further comprising:
    a power source operatively connected to the sensor system to supply power to the pair of electrodes.

6. The air filtration unit of claim 5, wherein the power source is a tunable DC current.

7. The air filtration unit of claim 1, further including:
    a light source disposed within the housing; and
    an optical sensor operatively connected to the processor and disposed within the housing and spaced apart from the light source,
    wherein the control system is operatively connected to the optical sensor to monitor the air flow within the housing.

8. The air filtration unit of claim 7, wherein the optical sensor is operative to detect hazardous particles in the airflow pathway.

9. The air filtration unit of claim 8, wherein the processor activates the alarm when hazardous particles are detected.

10. An air filtration and evacuation system comprising:
    at least one air filtration unit, each unit including:
        a housing having an air flow pathway extending therethrough, the housing configured to receive air flow from an inlet of the housing and to expel air flow from an outlet of the housing; and
        a pair of electrodes within the air flow pathway, wherein the pair of electrodes includes an ionizer electrode and a filter, the ionizer electrode being configured to charge particles comprised in the air flow so that the particles adhere to the filter;
    a central sensor system operatively connected to each pair of electrodes to sample an electrical measurement flowing therebetween, wherein the central sensor system selectively activates at least one electrostatic filter to trap hazardous particles from the air and create an egress path;
    a processor operatively connected to the central sensor system to compare the electrical measurement with a stored signature;
    an alarm operatively connected to the processor, wherein the processor activates the alarm when the electrical measurement is different from the stored signature; and
    a ventilation system operatively connected to the central sensor system.

11. The system as in claim 10, further comprising:
a memory operatively connected to processor for storing at least one electrical measurement as the stored signature.

12. The system of claim 11, wherein an electrical measurement different than the stored signature is indicative of hazardous particles within a building.

13. The system of claim 12, wherein the central sensor system selectively opens at least one vent of the air conditioning system to establish an egress path for building occupants.

14. The system as in claim 12, wherein the central sensor system is operatively connected to a lighting system such that upon detecting hazardous particles the control panel illuminates an egress path for building occupants through the lighting system.

15. A method for creating an egress path in a building, the steps comprising:
detecting hazardous particles indicative of a hazardous condition using at least one air filtration unit, each unit including:
a housing having an air flow pathway extending therethrough, the housing configured to receive air flow from an inlet of the housing and to expel air flow from an outlet of the housing; and
a pair of electrodes within the air flow pathway, wherein the pair of electrodes includes an ionizer electrode and a filter, the ionizer electrode being configured to charge particles comprised in the air flow so that the particles adhere to the filter;
a sensor system operatively connected to the pair of electrodes to measure electrical current flowing therebetween;
a processor operatively connected to the sensor system to compare the measured electrical current with a stored baseline current; and
an alarm operatively connected to the processor, wherein the processor activates the alarm when the measured electrical current is different from the stored baseline current;
selectively closing at least one vent of a heating ventilation and air conditioning (HVAC) unit of a building; and
selectively activating at least one electrostatic filter with the processor to trap the hazardous particles from the air and create an egress path.

16. The method of claim 15, further including:
selectively illuminating the egress path through a lighting system of the building.

17. The method of claim 15, wherein the measured electrical current being different from the stored baseline current is indicative of a hazardous condition within the building.

* * * * *